(12) United States Patent
Sato et al.

(10) Patent No.: US 11,678,072 B2
(45) Date of Patent: Jun. 13, 2023

(54) CONTROL APPARATUS, IMAGE PICKUP APPARATUS, CONTROL METHOD, AND STORAGE MEDIUM

(71) Applicant: CANON KABUSHIKI KAISHA, Tokyo (JP)

(72) Inventors: Natsuko Sato, Kanagawa (JP); Ryo Kawasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/722,912

(22) Filed: Apr. 18, 2022

(65) Prior Publication Data

US 2022/0345635 A1    Oct. 27, 2022

(30) Foreign Application Priority Data

Apr. 21, 2021 (JP) .............................. JP2021-071557

(51) Int. Cl.
*H04N 23/959* (2023.01)
*G03B 13/34* (2021.01)
*H04N 23/67* (2023.01)

(52) U.S. Cl.
CPC ........... *H04N 23/959* (2023.01); *G03B 13/34* (2013.01); *H04N 23/675* (2023.01)

(58) Field of Classification Search
CPC ......... H04N 5/23299; H04N 5/232123; H04N 5/232127; H04N 5/2259; H04N 5/232125; G03B 13/34
USPC ...................................................... 348/345
See application file for complete search history.

(56) References Cited

U.S. PATENT DOCUMENTS

| 10,341,567 | B2 * | 7/2019 | Ito ...................... H04N 23/6812 |
| 11,190,698 | B2 * | 11/2021 | Osawa .................... H04N 23/62 |
| 11,343,432 | B2 * | 5/2022 | Sato ...................... H04N 23/695 |
| 11,399,126 | B2 * | 7/2022 | Numata ............... H04N 23/673 |
| 2017/0272658 | A1 | 9/2017 | Ito |
| 2019/0268545 | A1 * | 8/2019 | Inomata ............... H04N 23/959 |
| 2020/0137293 | A1 * | 4/2020 | Numata ................ H04N 23/71 |
| 2020/0137313 | A1 * | 4/2020 | Sato ...................... H04N 23/673 |
| 2020/0191563 | A1 * | 6/2020 | Sato ........................ G03B 13/30 |

(Continued)

FOREIGN PATENT DOCUMENTS

| EP | 3648450 A | 5/2020 |
| EP | 3787279 A | 3/2021 |
| JP | 2017-173802 A | 9/2017 |

OTHER PUBLICATIONS

The above patent documents were cited in a European Search Report dated Oct. 4, 2022, that issued in the corresponding European Patent Application No. 22168950.8.

*Primary Examiner* — Pritham D Prabhakher
(74) *Attorney, Agent, or Firm* — Cowan, Liebowitz & Latman, P.C.

(57) ABSTRACT

A control apparatus includes a tilt driving unit configured to perform tilt driving, a focus driving unit, a control unit configured to control the focus driving unit and the tilt driving unit for focusing on at least a first area and a second area in a plurality of areas in an image, and a first determination unit configured to determine a control method of the control unit based on whether or not a difference between a position of at least one of the first area and the second area and a position corresponding to a tilt axis in the image is smaller than a predetermined threshold.

15 Claims, 15 Drawing Sheets

(56) References Cited

U.S. PATENT DOCUMENTS

| | | | |
|---|---|---|---|
| 2020/0236290 A1* | 7/2020 | Kawasaki | H04N 23/959 |
| 2020/0275032 A1* | 8/2020 | Kimura | H04N 23/673 |
| 2021/0067702 A1* | 3/2021 | Sato | G02B 7/287 |
| 2021/0067704 A1* | 3/2021 | Chino | G03B 13/34 |
| 2021/0144307 A1* | 5/2021 | Kimura | G02B 7/38 |

* cited by examiner

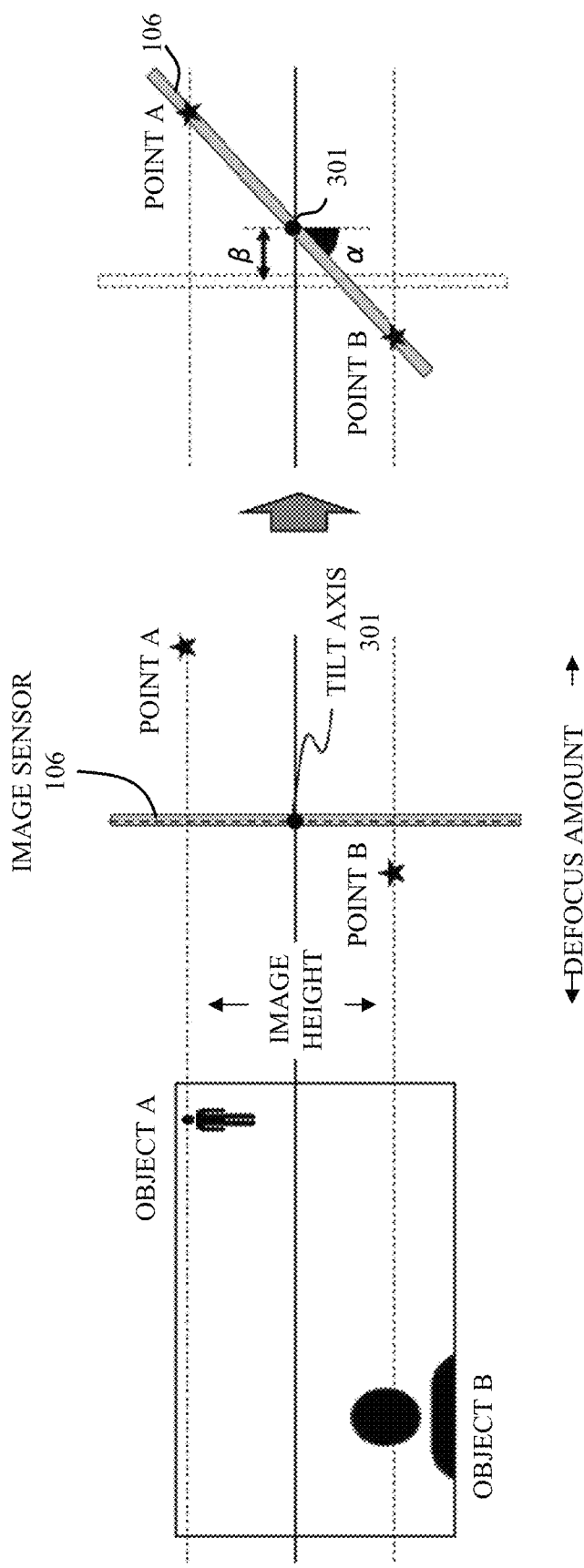

| CONTROL | EVALUATION VALUE CHANGE | | STATUS | NEXT CONTROL |
|---|---|---|---|---|
| | FRONT | BACK | | |
| TILT + DRIVING | O | O | TILT SHORTAGE | TILT + DRIVING |
| | O | X | EXCESSIVELY CLOSE TO FAR END | FOCUS NEAR DRIVING |
| | X | O | EXCESSIVELY CLOSE TO NEAR END | FOCUS FAR DRIVING |
| | X | X | TILT EXCESS | TILT - DRIVING |
| | X | X | REVERSE DRIVING ALSO XX: IN-FOCUS STATE | END |
| TILT - DRIVING | O | O | TILT EXCESS | TILT - DRIVING |
| | O | X | EXCESSIVELY CLOSE TO NEAR END | FOCUS FAR DRIVING |
| | X | O | EXCESSIVELY CLOSE TO FAR END | FOCUS NEAR DRIVING |
| | X | X | TILT SHORTAGE | TILT + DRIVING |
| | X | X | REVERSE DRIVING ALSO XX: IN-FOCUS STATE | END |
| FOCUS NEAR DRIVING | O | O | EXCESSIVELY CLOSE TO FAR END | FOCUS NEAR DRIVING |
| | O | X | TILT SHORTAGE | TILT + DRIVING |
| | X | O | TILT EXCESS | TILT - DRIVING |
| | X | X | EXCESSIVELY CLOSE TO NEAR END | FOCUS FAR DRIVING |
| | X | X | REVERSE DRIVING ALSO XX: IN-FOCUS STATE | END |
| FOCUS FAR DRIVING | O | O | EXCESSIVELY CLOSE TO NEAR END | FOCUS FAR DRIVING |
| | O | X | TILT EXCESS | TILT - DRIVING |
| | X | O | TILT SHORTAGE | TILT + DRIVING |
| | X | X | EXCESSIVELY CLOSE TO FAR END | FOCUS NEAR DRIVING |
| | X | X | REVERSE DRIVING ALSO XX: IN-FOCUS STATE | END |

FIG. 4

F: EVALUATION VALUE BECOMES LARGER BY FOCUS FAR DRIVING
N: EVALUATION VALUE BECOMES LARGER BY FOCUS NEAR DRIVING

| CONTROL | EVALUATION VALUE CHANGE | | STATUS | NEXT CONTROL |
|---|---|---|---|---|
| | FRONT | BACK | | |
| FOCUS DRIVING | F | F | EXCESSIVELY CLOSE TO NEAR END | FOCUS FAR DRIVING |
| | N | N | EXCESSIVELY CLOSE TO FAR END | FOCUS NEAR DRIVING |
| | N | F | TILT SHORTAGE | TILT + DRIVING |
| | F | N | TILT EXCESS | TILT - DRIVING |

FIG. 12

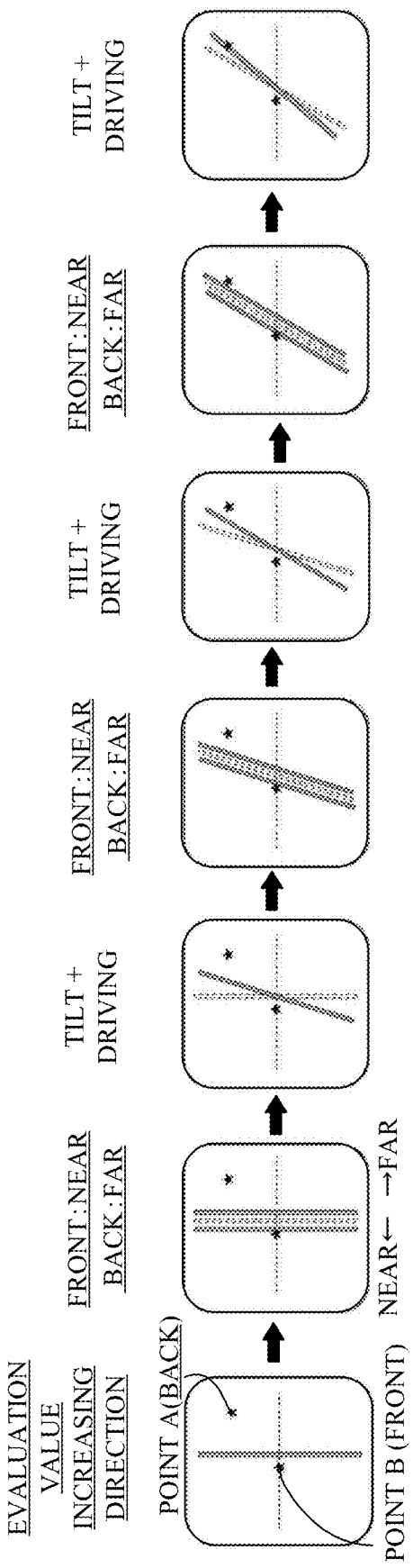
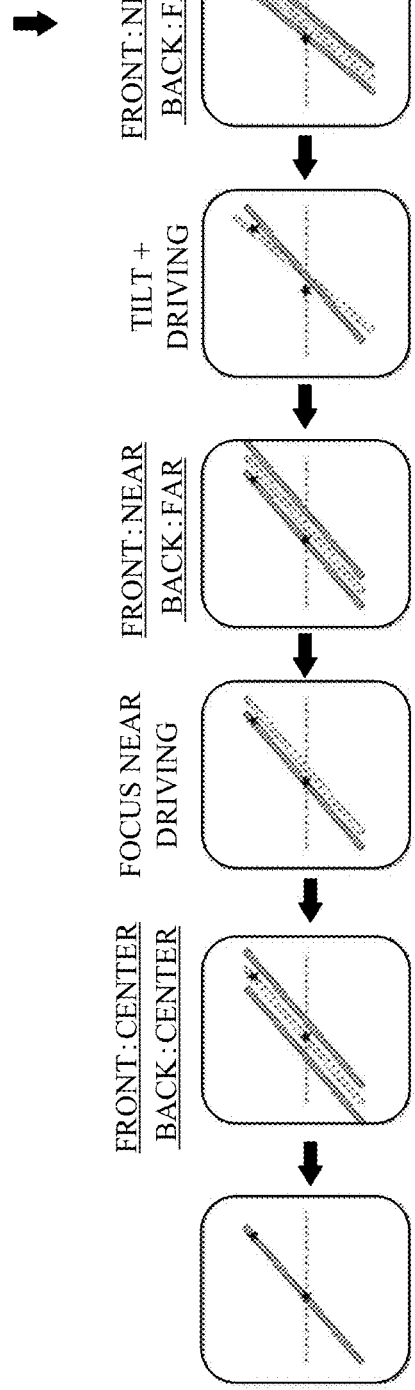
FIG. 13A FIG. 13B FIG. 13C FIG. 13D FIG. 13E FIG. 13F FIG. 13G
FIG. 13H FIG. 13I FIG. 13J FIG. 13K FIG. 13L FIG. 13M

CONTROL APPARATUS, IMAGE PICKUP APPARATUS, CONTROL METHOD, AND STORAGE MEDIUM

BACKGROUND OF THE INVENTION

Field of the Invention

The present invention relates to a control apparatus and an image pickup apparatus, each of which performs tilt control.

Description of the Related Art

A technology called the Scheimpflug principle is generally known that adjusts a focal plane by rotating an imaging plane so as to tilt the imaging plane relative to an imaging optical axis plane that is orthogonal to an imaging optical axis system for capturing an object (referred to as a "tilt control" hereinafter), and changes a depth of field for an imaging scene. Cameras for surveillance applications are demanded to capture an image with a deep depth of field. Using the above technology can increase the depth of field without narrowing an aperture stop (diaphragm) and obtain an image in which an imaging area is entirely in focus while suppressing object blurring and noise caused by a shortage of light intensity.

Japanese Patent Laid-Open No. ("JP") 2017-173802 discloses an image pickup apparatus that provides focus control based on focus shift amounts of a plurality of focal detecting areas (so that the focus shift amounts are minimized).

However, the image pickup apparatus disclosed in JP 2017-173802 acquires a control target position through calculation, and may not provide control that results in an ideal tilt angle and focus position due to mechanical errors. Instead of the control for the control target position that is acquired through calculation, it is conceivable to control both the tilt angle and the focus position while an in-focus level of an object is determined. However, in this case, depending on the setting of an area for determining the in-focus level of the object, a change in in-focus level cannot be correctly determined and the control may cause an incorrect tilt angle and focus position.

SUMMARY OF THE INVENTION

The present invention provides a control apparatus, an image pickup apparatus, a control method, and a storage medium, each of which can provide highly accurate focusing by switching a focusing control method according to a position of an area for calculating an evaluation value relating to an in-focus level.

A control apparatus according to one aspect of the present invention includes a tilt driving unit configured to perform tilt driving by changing a tilt of at least one of an image sensor and an optical system, a focus driving unit configured to perform focus driving by moving in an optical axis direction a focus lens that constitutes at least part of the optical system; at least one processor; and at least one memory coupled to the at least one processor storing instructions that, when executed by the at least one processor, cause the at least one processor to function as a control unit configured to control the focus driving unit and the tilt driving unit for focusing on at least a first area and a second area in a plurality of areas in an image, and a first determination unit configured to determine a control method of the control unit based on whether or not a distance between a position of at least one of the first area and the second area and a position corresponding to a tilt axis in the image is smaller than a predetermined threshold.

An image pickup apparatus according to another aspect of the present invention includes an image sensor and the above control apparatus. A control method corresponding to the control apparatus and a non-transitory computer-readable storage medium storing a program that causes a computer to execute the control method also constitutes another aspect of the present invention.

Further features of the present invention will become apparent from the following description of exemplary embodiments with reference to the attached drawings.

BRIEF DESCRIPTION OF THE DRAWINGS

FIGS. 3A to 3C explain a tilt angle correcting amount and a focus position correcting amount in each embodiment.

FIG. 4 explains the following control based on an evaluation value change in each embodiment.

FIG. 12 explains the next control based on a change in an evaluation value in the second embodiment.

FIGS. 13A to 13M explain a control method according to the second embodiment.

DESCRIPTION OF THE EMBODIMENTS

Referring now to the accompanying drawings, a detailed description will be given of embodiments according to the present invention.

Figure 1:
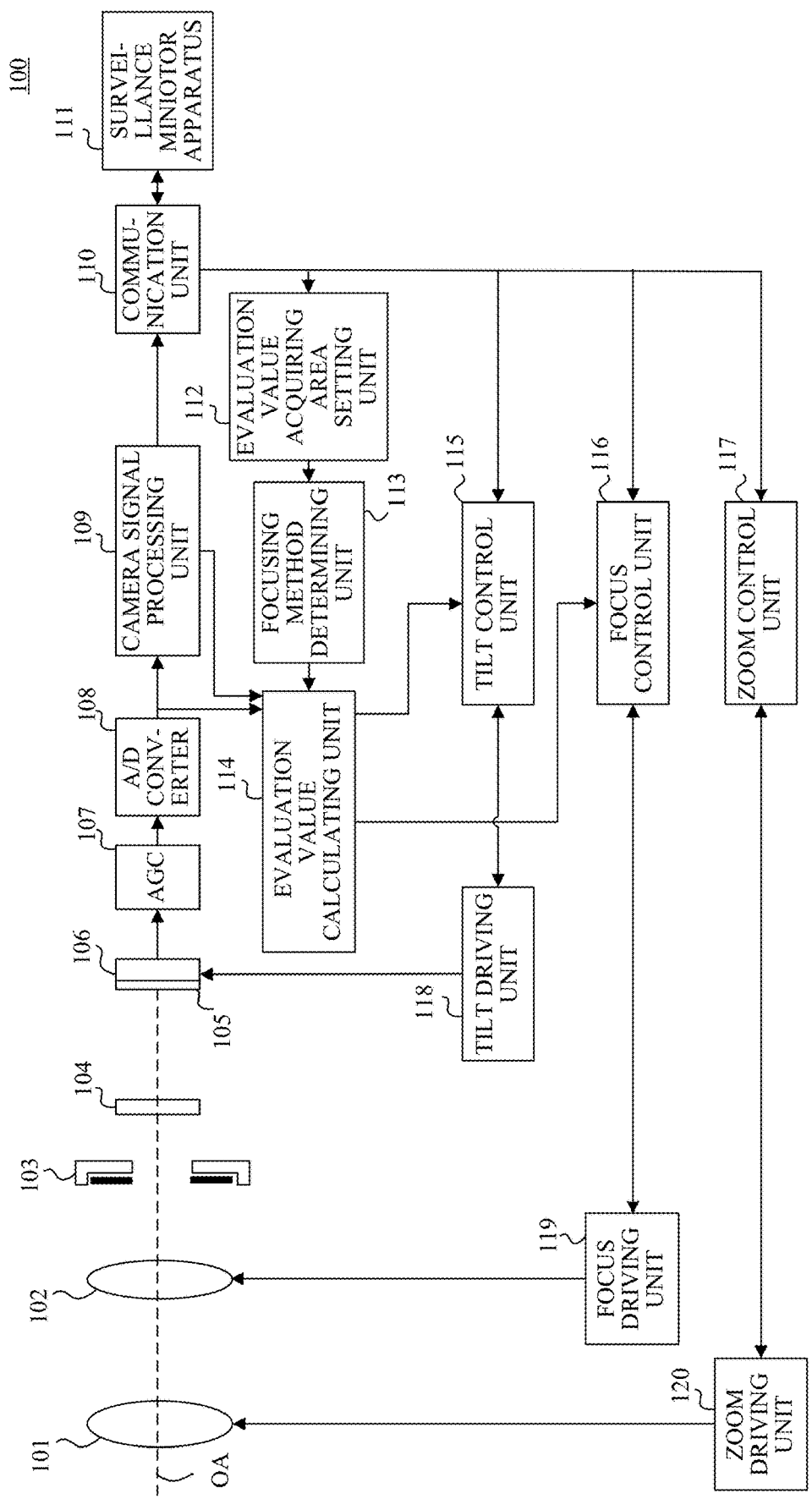
FIG. 1 is a block diagram of an image pickup apparatus according to each embodiment.

Referring now to FIG. 1, a description will be given of an image pickup apparatus 100 according to this embodiment. FIG. 1 is a block diagram of the image pickup apparatus 100. The image pickup apparatus 100 may have a structure in which a camera body and an imaging optical system (optical system) are integrated with each other, or a structure in which the imaging optical system (interchangeable lens) is attachable to and detachable from the camera body.

The imaging optical system includes a zoom lens 101 that moves in a direction along an optical axis OA (optical axis direction) to change a focal length, a focus lens 102 that moves in the optical axis direction for focusing, and an aperture stop (diaphragm) unit 103 that adjusts a light amount. The light that has passed through the imaging optical system forms an object image as an optical image on an image sensor 106 via a bandpass filter (BPF) 104 and a color filter 105. The BPF 104 may be insertable into and ejectable from an optical path of the imaging optical system.

The image sensor 106 is a CMOS sensor or a CCD sensor, and performs a photoelectric conversion for the object image that has been formed via the imaging optical system to output an analog electric signal (imaging signal). The analog electric signal that has been output from the image sensor 106 is gain-controlled by an AGC 107, converted into a digital signal by an A/D converter 108, and then input to a camera signal processing unit 109.

The camera signal processing unit 109 performs various image processing for the digital imaging signal to generate a video signal. The video signal is output to a surveillance monitor apparatus 111 that is connected to the image pickup apparatus 100 by wire or wireless communication via a communication unit 110. Upon receiving an instruction from a user, the surveillance monitor apparatus 111 outputs a control signal such as a command to each of an evaluation value acquiring area setting unit 112, a tilt control unit 115, a focus control unit 116, and a zoom control unit 117 in the image pickup apparatus 100 via the communication unit 110.

The evaluation value acquiring area setting unit 112 sets an area (evaluation value acquiring area) to be focused based on an instruction from the communication unit 110. The focusing method determining unit (first determination unit) 113 determines a focusing control method according to the area that has been set by the evaluation value acquiring area setting unit 112. The evaluation value calculating unit (second determination unit) 114 acquires (calculates or determines) an evaluation value relating to a contrast in the area that has been set by the evaluation value acquiring area setting unit 112 from the A/D converter 108 or the camera signal processing unit 109.

The tilt control unit (control unit) 115 instructs a tilt driving unit 118 on a tilt set position based on the focusing method that has been determined by the focusing method determining unit 113 and the evaluation value that has been calculated (determined) by the evaluation value calculating unit 114. The focus control unit (control unit) 116 instructs a focus driving unit 119 on a focus set position based on the focusing method that has been determined by the focusing method determining unit 113 and the evaluation value that has been calculated by the evaluation value calculating unit 114. The zoom control unit 117 instructs a zoom driving unit 120 on a zoom set position based on the instruction from the communication unit 110.

The tilt driving unit 118 drives the image sensor 106 based on the tilt set position that has been instructed by the tilt control unit 115. The focus driving unit 119 drives the focus lens 102 based on the focus set position that has been instructed by the focus control unit 116. The zoom driving unit 120 drives the zoom lens 101 based on the zoom set position that has been instructed by the zoom control unit 117.

Figure 2:
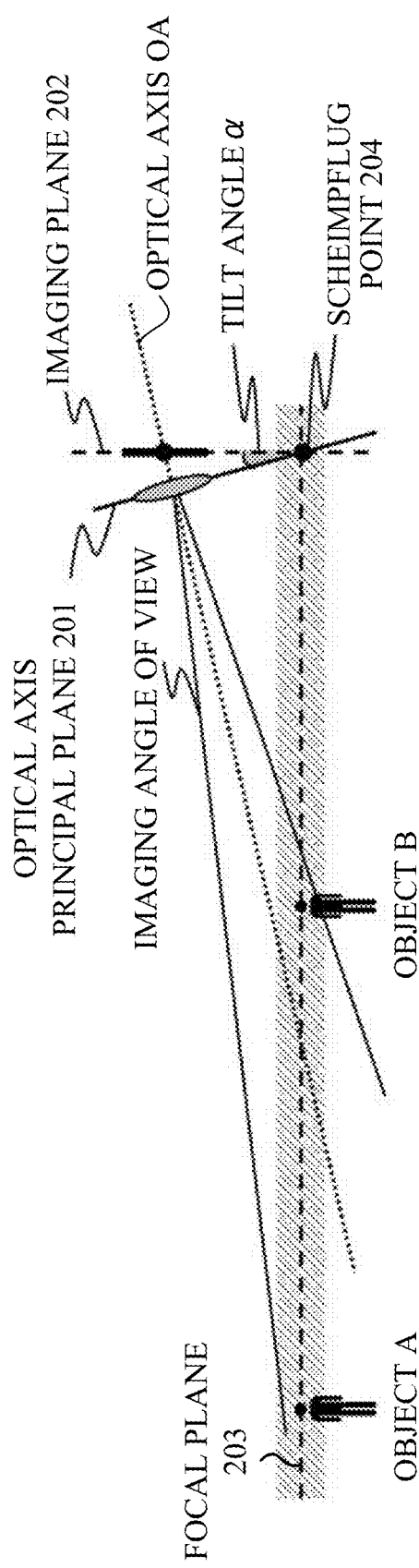
FIG. 2 explains a tilt control in each embodiment.

Referring now to FIGS. 2, 3A, and 3B, a description will be given of tilt control. FIG. 2 explains the tilt control, and illustrates an example of the tilt control such that faces of two objects A and B are in focus which are located within an imaging angle of view at different distances from the image pickup apparatus 100. The principle of tilt control is called the Scheimpflug principle, in which when an optical system principal plane 201 and an imaging plane 202 intersect each other at one point (Scheimpflug point 204), a focal plane 203 also intersects them at that point. From the Scheimpflug principle, a tilt angle α is calculated by the following expression (1) where F is a focal length, L is an object distance, and θ is a depression angle.

$$\alpha = \tan^{-1}(f/L \tan \theta) \quad (1)$$

Thereby, all objects from a short distance to a long distance on a certain plane can be focused.

FIGS. 3A to 3C explain a target scene for the tilt control, and a tilt angle correcting amount α and α focus position correcting amount β suitable for the scene. The scene in FIG. 3A illustrates two objects A and B located at different distances from the image pickup apparatus 100. FIG. 3B schematically illustrates a relationship among a position of the image sensor 106, an in-focus position of the object A (point A), and an in-focus position of the object B (point B) for the scene illustrated in FIG. 3A. A vertical position of each of the object A and B represents an image height, and a horizontal distance of each of the object A and B from the image sensor 106 represents a defocus amount. In order to focus on both the objects A and B, the image sensor 106 may be driven by the tilt angle correcting amount α (tilt angle α) and the focus lens 102 may be driven by the focus position correcting amount β so that the imaging plane 202 is aligned with (contains) the points A and B as illustrated in FIG. 3C.

Figure 5:
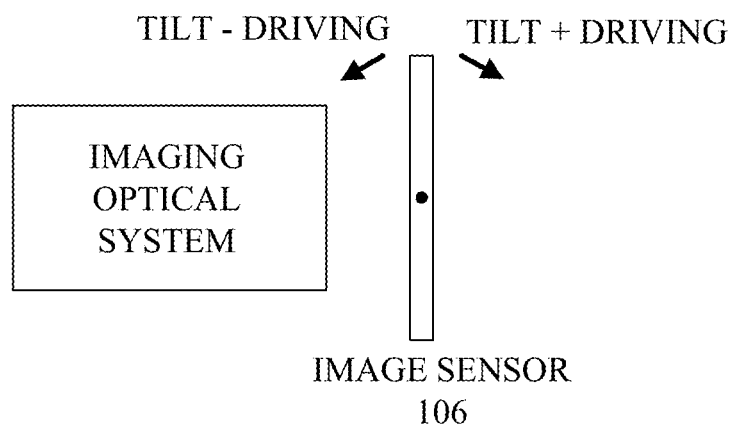
FIG. 5 explains a tilt driving direction in each embodiment.
Figure 6:
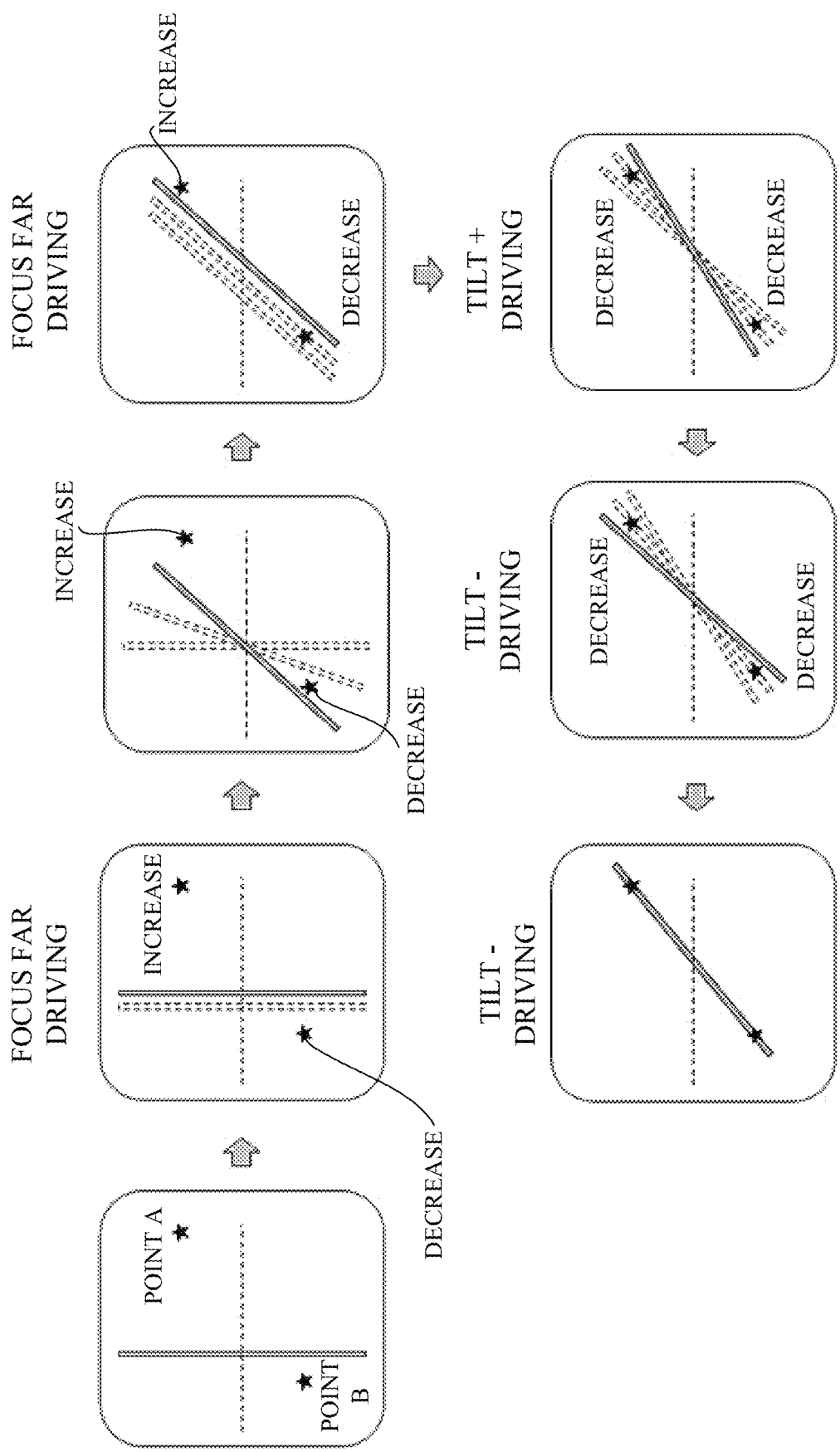
FIG. 6 is a schematic diagram of a positional relationship between an image sensor and points A and B in each embodiment.

Referring now to FIGS. 4 to 6, a description will be given of an example of a control determination condition for gradually bringing both the objects A and B located in the two areas closer to in-focus states by determining the next control based on evaluation value changes of the two, front and back, areas, in a case where the focus position and the tilt angle are slightly driven. FIG. 4 explains the next control that is determined based on the evaluation value change. FIG. 5 explains a tilt driving direction.

In FIG. 4, "tilt+driving" and "tilt−driving" are defined as tilt driving in plus (+) and minus (−) direction illustrated in FIG. 5. FIG. 6 schematically illustrates a positional relationship between the image sensor 106 and the points A and B in a case where control is made for focusing on the points A and B based on the determination condition illustrated in FIG. 4. Since the tilt driving and the focus driving change the relative positional relationship between the image sensor 106 and the focus lens 102, either the image sensor 106 or the focus lens 102 may be driven. As illustrated in FIG. 6, focusing on the points A and B is available by determining the next control based on the evaluation value change in the case of fine tilt or focus driving.

Figures 7A, 7B:
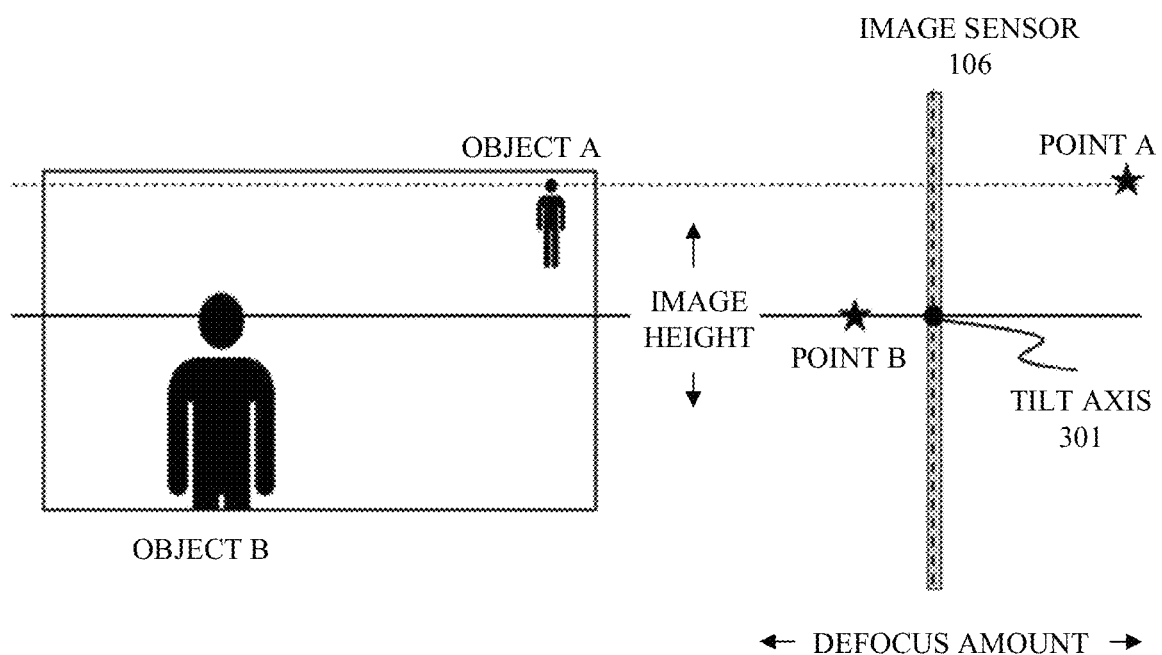
FIGS. 7A and 7B explain a scene in each embodiment.

FIGS. 7A and 7B explain a scene in this embodiment. FIG. 7A illustrates the scene for tilt control in a case where the object B is located near a position corresponding to a tilt axis 301 in a captured image. FIG. 7B schematically illustrates a relationship between the position of the image sensor 106, the in-focus position of the object A (point A), and the in-focus position of the object B (point B) for the scene illustrated in FIG. 7A. A vertical position of each of the object A and B represents an image height, and a horizontal distance of each of the object A and B from the image sensor 106 represents a defocus amount.

Figure 8B:
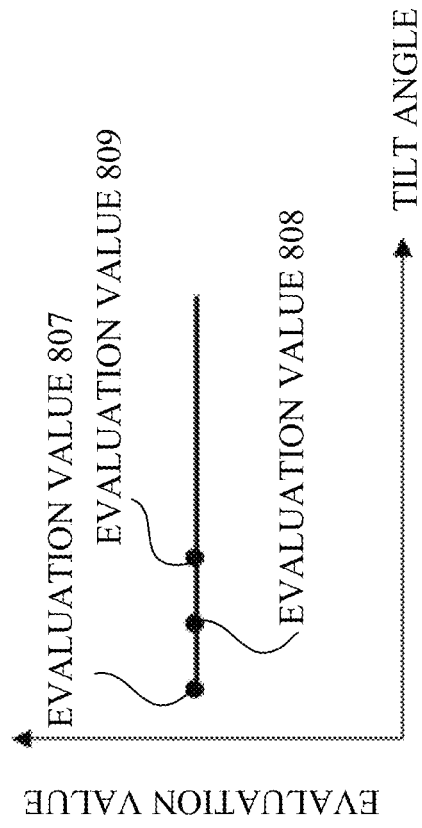
FIGS. 8A to 8C explain changes in evaluation values of scenes in each embodiment.
Figure 8C:
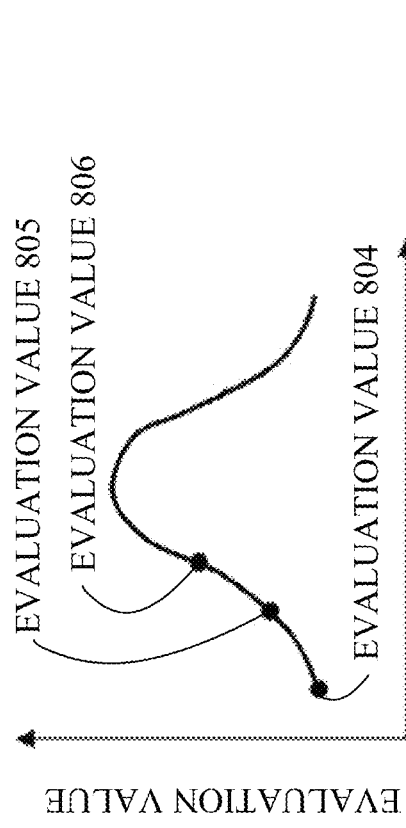
Figure 8A:
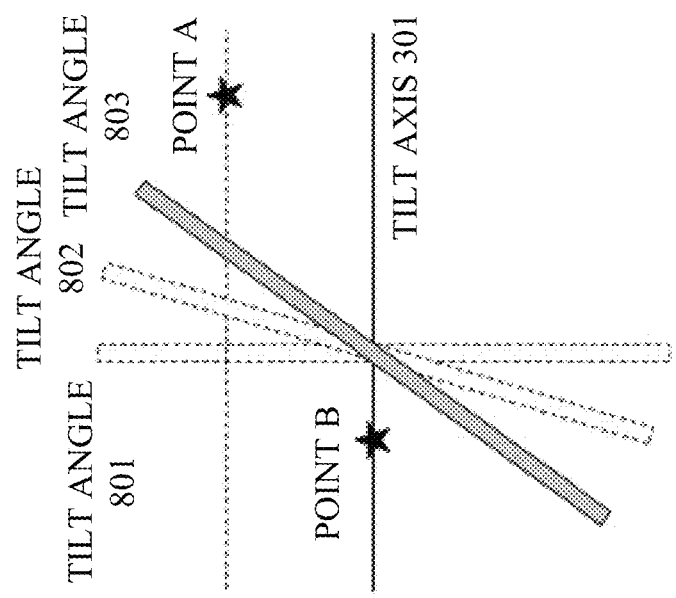

FIGS. 8A to 8C explain an evaluation value change in a scene. FIG. 8A illustrates a positional relationship among the tilt axis 301, tilt angles 801 to 803, and the points A and B. FIGS. 8B and 8C illustrate evaluation value changes at the points A and B, respectively, in a case where the tilt angle is changed to the tilt angles 801, 802, and 803. In FIGS. 8B and 8C, a horizontal axis indicates the tilt angle, and a vertical axis indicates the evaluation value.

Evaluation values 804, 805, and 806 for the point A in FIG. 8B and evaluation values 807, 808, and 809 for the point B in FIG. 8C correspond to the evaluation values for the tilt angles 801, 802, and 803, respectively. For the point A, the tilt+driving brings the positions of the point A and the image sensor 106 closer to each other, and the evaluation value is increased as illustrated in FIG. 8B. On the other hand, for the point B located on the tilt axis 301, the tilt driving does not change the evaluation value as illustrated in FIG. 8C. Thus, the tilt driving does not change the evaluation value on the tilt axis 301, and if control is made based on the determination condition illustrated in FIG. 4, control for the in-focus state may not be made due to an erroneous determination. In each embodiment, the tilt axis 301 is located at, but is not limited to, a specific position, such as a horizontal direction of a central part, in the image.

In each of the following embodiments, a description will be given of a method of switching the focusing control method in a case where both the tilt angle and the focus position are controlled while an in-focus level of an object is determined, and the evaluation value acquiring area of the evaluation value for the focusing control is located on the tilt axis 301. Thereby, highly accurate focusing is available.

First Embodiment

Figure 9:
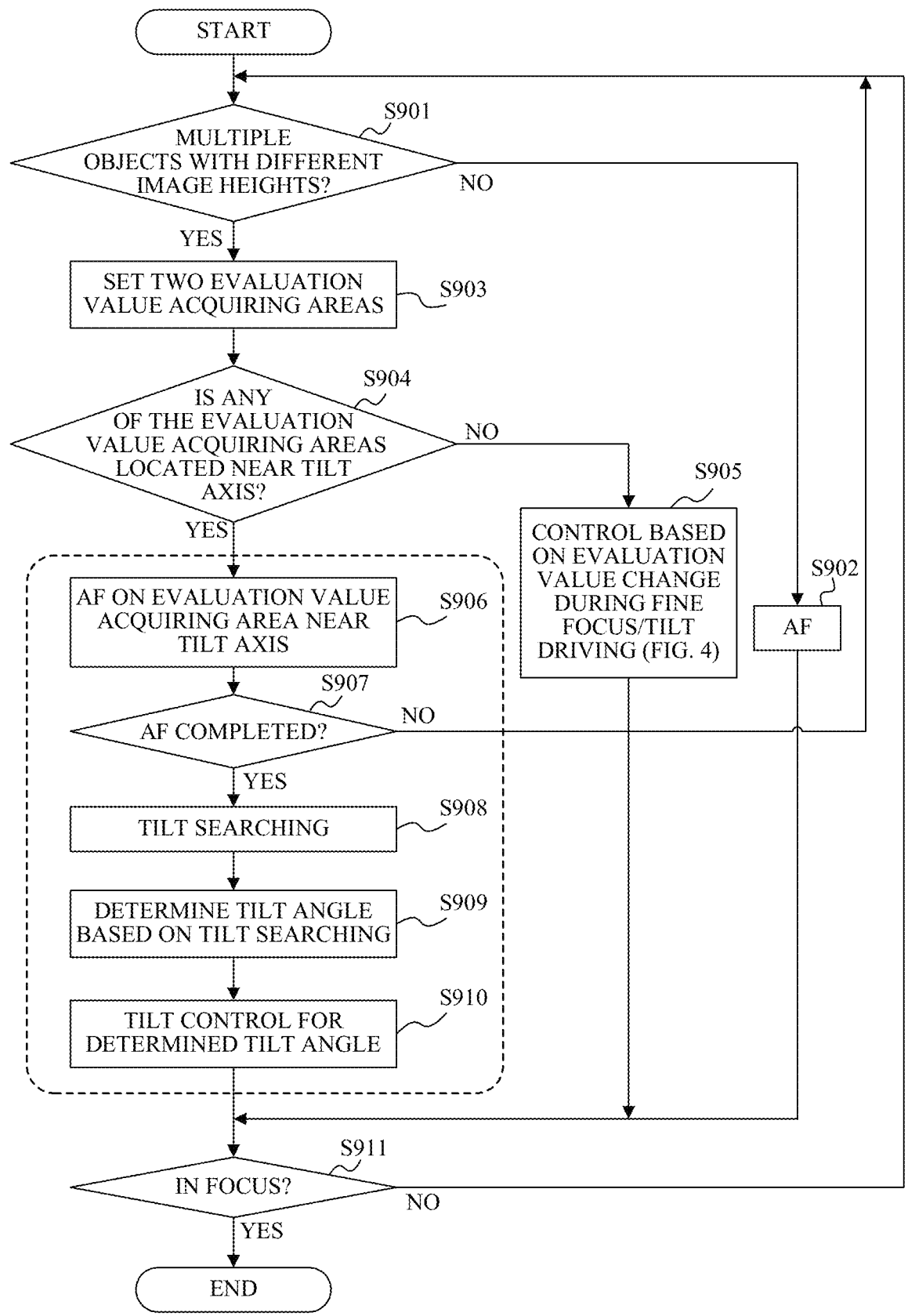
FIG. 9 illustrates a flowchart of a control method according to a first embodiment.

Referring now to FIG. 9, a description will be given of a control method (focusing control) according to a first embodiment. As illustrated in FIGS. 7A and 7B, this embodiment relates to a focusing control method in a scene in which an object is located at a position corresponding to the tilt axis 301 in a captured image. FIG. 9 illustrates a flowchart of the control method according to this embodiment.

First, in the step S901, the evaluation value acquiring area setting unit 112 determines whether or not there are a plurality of objects having different image heights in the scene. The object may be detected by the object detection in the image pickup apparatus 100, or the determination may be made according to the instruction (operation) from the user via the surveillance monitor apparatus 111. If it is determined that there are not the plurality of objects having different image heights, the flow proceeds to the step S902. If it is determined in the step S901 that there are not the plurality of objects having different image heights, it is unnecessary to increase the depth of field by the tilt control. Therefore, in the step S902, the focus control unit 116 performs autofocus (AF) control for one certain object, and proceeds to the step S911.

On the other hand, in the case where it is determined in the step S901 that there are the plurality of objects having different image heights, the flow proceeds to the step S903. In the case where it is determined in the step S901 that there are the plurality of objects having different image heights, this scene needs to increase the depth of field using the tilt control. Therefore, in the step S903, the evaluation value acquiring area setting unit 112 sets two areas having different image heights among the plurality of objects to evaluation value acquiring areas. The evaluation value acquiring area may be either an area in which the object is detected by the object detection or an area designated by the user.

Next, in the step S904, the focusing method determining unit 113 determines whether any of the two evaluation value acquiring areas set in the step S903 exists near the position corresponding to the tilt axis in the captured image. In a case where it is determined that neither of the two evaluation value acquiring areas exists near the position corresponding to the tilt axis in the captured image, the flow proceeds to the step S905. On the other hand, in a case where it is determined that any of the two evaluation value acquiring areas exists near the position corresponding to the tilt axis in the captured image, the flow proceeds to a focusing control method (steps S906 to S910) enclosed by a dotted line. Whether or not the evaluation value acquiring area exists near the position corresponding to the tilt axis in the captured image can be determined by calculating a difference in distance between the position of the evaluation value acquiring area and the position of the tilt axis (rotation axis of the tilt driving unit) and by determining whether the difference is smaller than a predetermined threshold. The predetermined threshold may be set based on a depth of field that is determined based on a focal length, an object distance, and an F-number. The predetermined threshold may be set smaller as the depth of field is shallower and set larger as the depth of field is deeper. That is, the predetermined threshold is a first threshold in a case where the depth of field is shallower than the predetermined depth of field, and the predetermined threshold is a second threshold larger than the first threshold in a case where the depth of field is deeper than the predetermined depth of field.

In a case where it is determined in the step S904 that neither of the two evaluation value acquiring areas exists near the position corresponding to the tilt axis in the captured image, the flow proceeds to the step S905. In the step S905, the tilt control unit 115 and the focus control unit 116 perform control as illustrated in FIG. 6 based on the determination condition illustrated in FIG. 4. Thereby, control can be made such that the objects A and B located in the two evaluation value acquiring areas are in the in-focus state.

On the other hand, in a case where it is determined in the step S904 that any of the two evaluation value acquiring areas exists near the position corresponding to the tilt axis in the captured image, the flow proceeds to step S906. In the step S906, the evaluation value calculating unit 114 and the focus control unit 116 perform AF in the evaluation value acquiring area that has been determined to exist near the position corresponding to the tilt axis in the captured image, and perform control that fixes a focus position (one-shot AF). Next, in the step S907, the focus control unit 116 determines whether or not the evaluation value acquiring area existing near the tilt axis is in the in-focus state on the object, that is, whether or not the one-shot AF is completed. In a case where it is determined that it is not in the in-focus state on the object, it is conceivable that the object has moved from the evaluation value acquiring area set in the step S903. Therefore, the steps S901 to S907 are repeated.

On the other hand, in a case where it is determined that it is in the in-focus state on the object, the flow proceeds to the step S908. In the step S908, the tilt control unit 115 and the evaluation value calculating unit 114 search an evaluation value different from the evaluation value acquiring area existing near the position corresponding to the tilt axis in the captured image among the two evaluation value acquiring areas, for an evaluation value peak while changing the tilt angle (perform tilt searching). Next, in the step S909, the tilt control unit 115 determines a tilt angle when the evaluation value is maximum, based on a tilt searching result in the step S908. Next, in the step S910, the tilt control unit 115 performs the tilt control based on the tilt angle that has been determined in the step S909.

Figure 10:
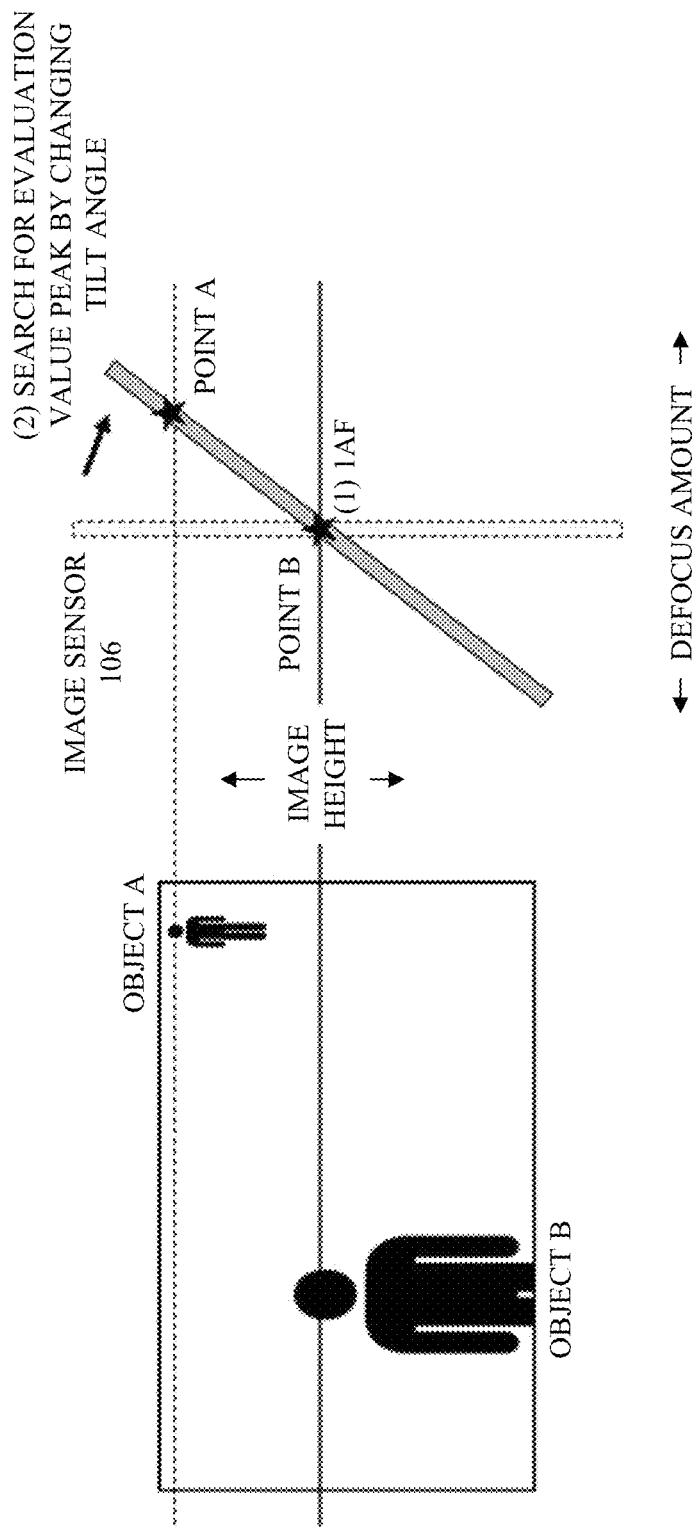
FIG. 10 explains a focusing control method according to the first embodiment.

Referring now to FIG. 10, a description will be given of a procedure of the steps S906 to S910 (focusing control method) illustrated in FIG. 9. FIG. 10 illustrates the procedure of the steps S906 to S910. A vertical position of each of the object A and B represents an image height, and a horizontal distance of each of the object A and B from the image sensor 106 represents a defocus amount. Tilt control can be made such that the points A and B are in focus by performing the one-shot AF for the evaluation value acquiring area that has been set to the object B located at the position corresponding to the tilt axis in the captured image, and by performing tilt searching in the evaluation value acquiring area that has been set to the object A.

Next, in the step S911 in FIG. 9, the evaluation value calculating unit 114 determines whether or not both of the two evaluation value acquiring areas are in focus (whether or not they are in the in-focus states). In a case where at least one of the two evaluation value acquiring areas is not in focus, the steps S901 to S911 are repeated. On the other hand, in a case where both of the two evaluation value acquiring areas are in focus, this flow is terminated.

This embodiment can thus provide highly accurate focusing even in a case where an evaluation value acquiring area is set to a position corresponding to a tilt axis in a captured image.

Second Embodiment

Figure 11A:
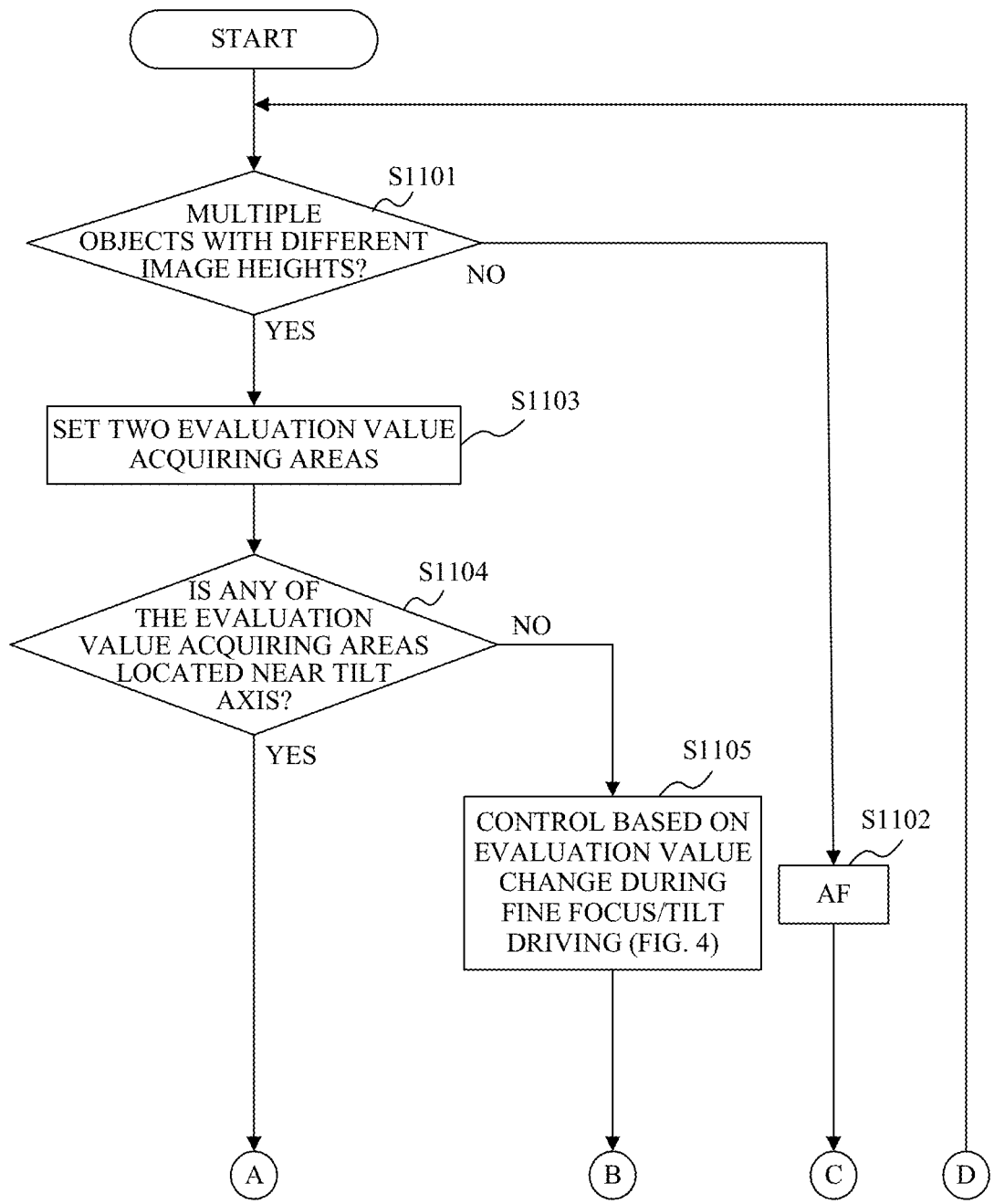
FIGS. 11A and 11B illustrate a flowchart of a control method according to a second embodiment.
Figure 11B:
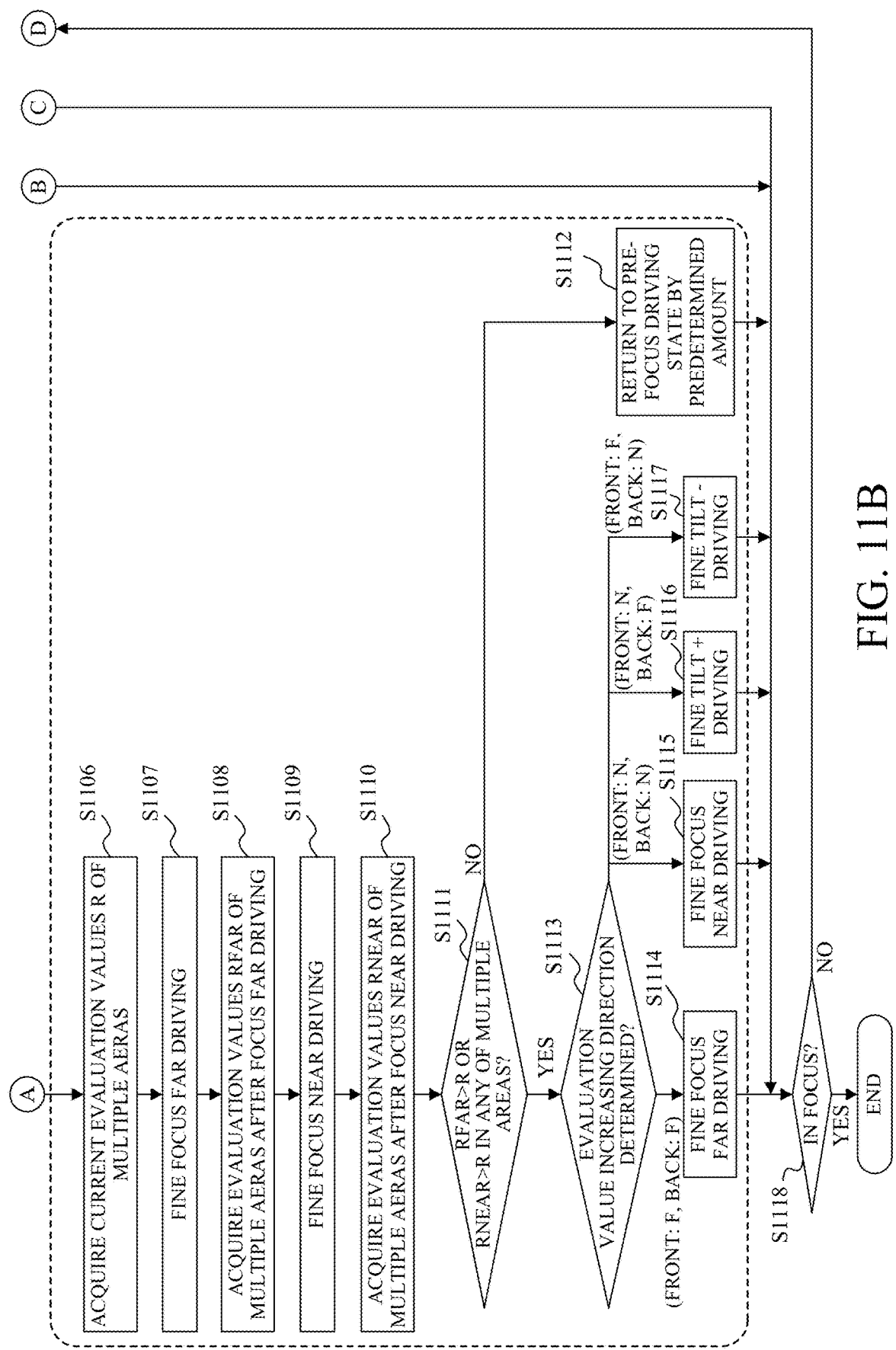

Referring now to FIGS. 11A and 11B, a description will be given of a control method (focusing control) according to a second embodiment. As illustrated in FIGS. 7A and 7B, this embodiment relates to a focusing control method in a scene in which an object exists on the tilt axis 301. FIGS. 11A and 11B illustrate a flowchart of the control method according to this embodiment. Since the steps S1101 to S1105 in FIGS. 11A and 11B are the same as the steps S901 to S905 in FIG. 9, a description thereof will be omitted.

In a case where it is determined in the step S1104 that any of the two evaluation value acquiring areas exists near the position corresponding to the tilt axis in the captured image, the flow proceeds to the focusing control method (steps S1106 to S1117) enclosed by a dotted line. The steps S1106 to S1117 illustrate the focusing control method for determining the next control based on evaluation value changes of the two, front and back, evaluation value acquiring areas, in a case of fine focus driving toward an infinity end or side (Far) and a close (short distance) end or side (Near).

FIG. 12 illustrates an example of a determination condition in the focusing control method in this embodiment, and explains the next control based on the evaluation value change. In this embodiment, unlike the determination condition of the first embodiment illustrated in FIG. 4, the next control is not determined based on an evaluation value change in the case of the tilt driving. This is because, as illustrated in FIGS. 8A to 8C, in a case where the evaluation value acquiring area exists at the position corresponding to the tilt axis in the captured image, the evaluation value of the evaluation value acquiring area is not changed by the tilt driving, the determination using this evaluation value causes an error, and the next control cannot be correctly determined. The determination condition illustrated in FIG. 12 determines the next control based on which of fine focus driving to the infinity end (focus Far driving) or fine focus driving to the close (short-distance) end (focus Near driving) by a predetermined amount increases the evaluation value of each evaluation value acquiring area. FIGS. 13A to 13M explain the control method according to this embodiment, and schematically illustrate a case where control is made for focusing on the points A and B based on the determination condition of FIG. 12.

In the step S1106 in FIGS. 11A and 11B, the evaluation value calculating unit 114 calculates (acquires) a current evaluation value R in each of the two evaluation value acquiring areas set in the step S1103. The current evaluation value R is an evaluation value in a state before the focus driving illustrated by dotted lines in FIGS. 13B to 13L. As illustrated in FIG. 13L, the current evaluation value R is used for end determination processing (S1111) for stopping the focusing operation in a case where a pre-focus driving state has already been in the in-focus state on the points A and B and the evaluation value decreases in any of the focus Far driving and the focus Near driving.

Next, in the step S1107, the focus control unit 116 provides fine focus Far driving by a predetermined amount. At this time, the image sensor 106 may be driven instead of the focus lens 102. In FIGS. 13B, 13D, 13F, 13H, 13J, and 13L, the image sensor 106 illustrated by solid lines on the Far side of the image sensor 106 illustrated by dotted lines represents the image sensor 106 as a result of the fine Far driving by the predetermined amount.

Next, in the step S1108 illustrated in FIG. 11A, after the focus Far driving in the step S1107, the evaluation value calculating unit 114 acquires an evaluation value Rfar of each of the two evaluation value acquiring areas that have been set in the step S1103. Next, in the step S1109, the focus control unit 116 provides fine focus Near driving by a predetermined amount. At this time, either the focus lens 102 or the image sensor 106 may be driven similarly to the case of the focus Far driving. In FIGS. 13B, 13D, 13F, 13H, 13J, and 13L, the image sensor 106 illustrated by the solid lines on the Near side of the image sensor 106 illustrated by the dotted lines represents the image sensor 106 as a result of the fine focus Near driving by the predetermined amount.

Next, in the step S1110, after the focus Near driving in the step S1109, the evaluation value calculating unit 114 acquires the evaluation value Rnear of each of the two evaluation value acquiring areas set in the step S1103. Next, in the step S1111, the evaluation value calculating unit 114 compares the current evaluation value R acquired in the step S1106 with each of Rfar and Rnear acquired in the steps S1108 and S1110 of each of the two evaluation value acquiring areas. The evaluation value calculating unit 114 determines whether or not the evaluation value is increased by the focus Far or Near driving of any of the two evaluation value acquiring areas. In a case where the evaluation values of all the evaluation value acquiring areas are not increased by the focus Far or Near driving (FIG. 13L), the pre-focus driving position becomes a proper focus position.

In a case where it is determined in the step S1111 that the evaluation values of both of the two evaluation value acquiring areas are not increased by the focus Far or Near driving (Rfar≤R and Rnear≤R), the flow proceeds to the step S1112. In the step S1112, the focus control unit 116 returns to the state before the focus driving (FIG. 13M). On the other hand, in a case where it is determined in the step S1111 that the evaluation value of any of the two evaluation value acquiring areas is increased by the focus Far or Near driving (Rfar>R or Rnear>R), the flow proceeds to the step S1113.

In the step S1113, the evaluation value calculating unit 114 determines a focus direction (evaluation value increasing direction) in which the evaluation value of each of the two evaluation value acquiring areas increases, based on the evaluation values Rfar and Rnear acquired in the steps S1108 and S1110. The evaluation value calculating unit 114 determines control to be performed next according to the determination condition illustrated in FIG. 12. In FIGS. 13B, 13D, 13F, and 13H, in the case of focus Far and Near driving, the evaluation value of the front evaluation value acquiring area becomes larger in the focus Near driving, and the evaluation value of the back evaluation value acquiring area becomes larger in the focus Far driving. In this case, based on the determination condition illustrated in FIG. 12, the control to be performed next becomes tilt+driving. In FIG. 13J, the evaluation values of both the front and back evaluation value acquiring areas become larger in the focus Near driving. In this case, the next control to be performed is focus Near driving.

In the steps S1114 to S1117, the focus control unit 116 or the tilt control unit 115 provides fine focus or tilt driving by a predetermined amount based on the next control determined based on the determination result (FIGS. 13C, 13E, 13G, 13I, and 13K). After the steps S1114, S1115, S1116, or S1117, the flow proceeds to the step S1118. In the step S1118, the evaluation value calculating unit 114 determines whether or not both of the two evaluation value acquiring areas are in focus (whether or not they are in the in-focus states). In a case where at least one of the two evaluation value acquiring areas is not in the in-focus state, the steps S1101 to S1118 are repeated. On the other hand, in a case where both of the two evaluation value acquiring areas are in the in-focus states, this flow is terminated.

This embodiment can provide highly accurate focusing even in a case where the evaluation value acquiring area is set near the position corresponding to the tilt axis.

In each embodiment, the focusing method is switched based on the determination result of whether or not the evaluation value acquiring area exists near the position corresponding to the tilt axis in the captured image. However, in each embodiment, even in a case where it is once determined that the evaluation value acquiring area does not exist near the position corresponding to the tilt axis in the captured image, the focusing method may be switched by making the determination based on the size of the evaluation value change amount caused by the tilt driving.

Figure 14:
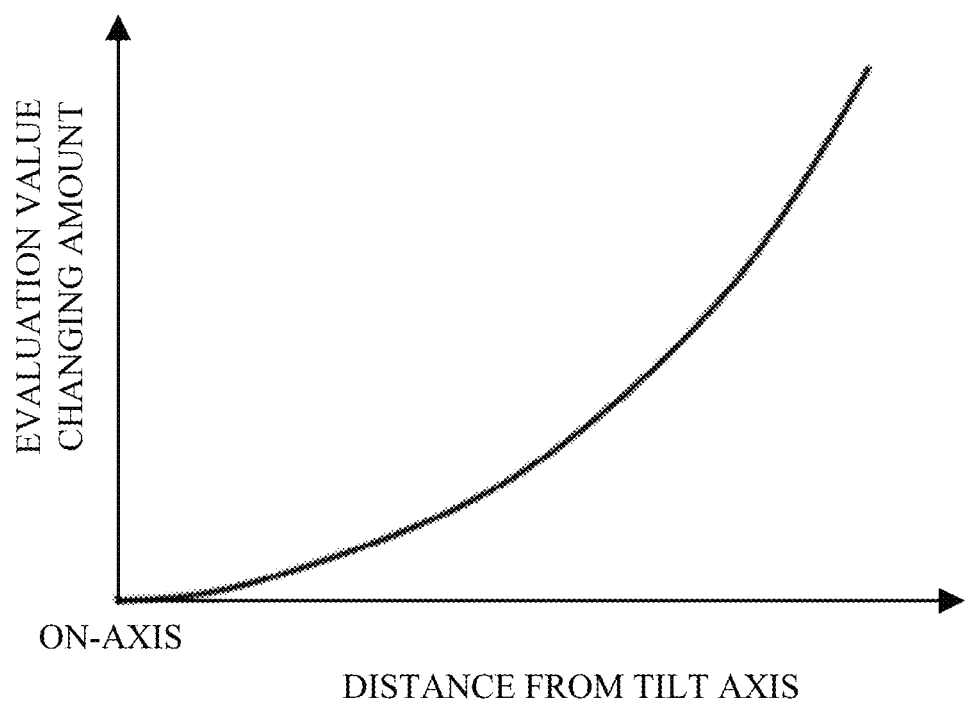
FIG. 14 illustrates a relationship between a distance from a tilt axis of an evaluation value acquiring area and an evaluation value changing amount in each embodiment.

FIG. 14 illustrates a relationship between a distance of the evaluation value acquiring area from the position corresponding to the tilt axis and an evaluation value changing amount. In FIG. 14, a horizontal axis represents the distance of the evaluation value acquiring area from the position corresponding to the tilt axis, and a vertical axis represents the evaluation value changing amount. As illustrated in FIG. 14, the evaluation value changing amount increases as the distance of the evaluation value acquiring area from the position corresponding to the tilt axis in the captured image increases. Therefore, the evaluation value acquiring area near the position corresponding to the tilt axis in the captured image has a smaller predetermined threshold for the evaluation value change, and an evaluation value acquiring area farther from the position corresponding to the tilt axis has a larger predetermined threshold for the evaluation value change. Thereby, it is possible to determine whether or not there is no expected evaluation value change for the position of the evaluation value acquiring area, that is, whether or not the evaluation value is not suitable for the focusing control. In that case, highly accurate focusing can be provided by switching to the focusing method that does not perform the evaluation value determination through the tilt control.

As described above, in each embodiment, the control apparatus includes the tilt driving unit 118, the focus driving unit 119, the control unit (tilt control unit 115 and focus control unit 116), and the first determination unit (focusing method determining unit 113). The tilt driving unit performs tilt driving by changing the tilt of at least one of the image sensor 106 and the optical system (imaging optical system). The focus driving unit performs focus driving by moving in the optical axis direction the focus lens 102, which constitutes at least part of the optical system. The control apparatus may further include the second determination unit (evaluation value calculating unit 114) that determines the evaluation value relating to the in-focus level (evaluation value regarding contrast) of each of the plurality of areas in an image. The control unit controls the focus driving unit and the tilt driving unit for focusing on each of at least the first area and the second area (at least two evaluation value acquiring areas) among the plurality of areas. The first determination unit determines the control method of the control unit based on whether or not the difference in distance between the position of at least one of the first area and the second area and the position corresponding to the tilt axis in the image is smaller than the predetermined threshold.

The predetermined threshold may be set based on a depth of field. The predetermined threshold may be the first threshold in a case where the depth of field is shallower than a predetermined depth of field, and the predetermined threshold is the second threshold larger than the first threshold in a case where the depth of field is deeper than the predetermined depth of field.

The first determination unit may set the control method to the first method in a case where the difference in distance between the position of at least one of the first area and the second area and the position corresponding to the tilt axis is larger than the predetermined threshold. On the other hand, the first determination unit may set the control method to the second method in a case where the difference in distance between the position of at least one of the first area and the second area and the position corresponding to the tilt axis is smaller than the predetermined threshold. In the first method, the control unit may control the focus driving unit or the tilt driving unit based on the evaluation value change of the first area and the second area during the focus driving or the tilt driving.

In the second method, the control unit may perform control based on the evaluation value change of at least one of the first area and the second area during the focus driving, and the control unit performs control based on the evaluation value change of an area of the first area and the second area during the tilt driving in which the difference in distance is determined to be larger than the predetermined threshold. In the second method, the control unit may control, through the focus driving, for focusing on an area of the first area and the second area in which the difference in distance is determined to be smaller than the predetermined threshold, and then performs control, through the tilt driving, for focusing on an area of the first area and the second area in which the difference in distance is determined to be larger than the predetermined threshold.

In the second method, the control unit may control the focus driving unit and the tilt driving unit based on the evaluation value change of each of the first area and the second area during the focus driving. The control unit may determine that there is the evaluation value change in a case where an evaluation value changing amount caused by the focus driving and the tilt driving is larger than a predetermined evaluation value changing amount. The predetermined evaluation value changing amount caused by the tilt driving may be a first evaluation value changing amount in a case where the difference in distance is the first difference. The predetermined evaluation value changing amount caused by the tilt driving may be the second evaluation value changing amount larger than the first evaluation value changing amount in a case where the difference in distance is a second difference larger than the first difference. The control unit may set the second method in a case where it is determined that there is no evaluation value change caused by the tilt driving. The first area and the second area may be at least one of an area designated by the user and an area in which an object is detected by an object detection.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention provides a control apparatus, an image pickup apparatus, a control method, and a storage medium, each of which can provide focusing with high accuracy by switching a focusing control method according to a position of an area for calculating an evaluation value relating to an in-focus level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-071557, filed on Apr. 21, 2021, which is hereby incorporated by reference herein in its entirety.

What is claimed is:

1. A control apparatus comprising:
a tilt driving unit configured to drive an image sensor to change a tilt of the image sensor;
a focus driving unit configured to drive a focus lens to move the focus lens in an optical axis direction;
at least one processor; and
at least one memory coupled to the at least one processor storing instructions that, when executed by the at least one processor, cause the at least one processor to function as:
a control unit configured to control the focus driving unit and the tilt driving unit for focusing on at least a first area and a second area in a plurality of areas in an image; and
a first determination unit configured to determine a control method of the control unit based on whether or not a distance between a position of at least one of the first area and the second area and a position corresponding to a tilt axis in the image is smaller than a predetermined threshold,
wherein the first determination unit sets the control method to a first method in a case where the distance between the position of the first area and the position corresponding to the tilt axis and the distance between the position of the second area and the position corresponding to the tilt axis are not smaller than the predetermined threshold, and
wherein the first determination unit sets the control method to a second method which is different from the first method in a case where the distance between the position of at least one of the first area and the second area and the position corresponding to the tilt axis is smaller than the predetermined threshold.

2. The control apparatus according to claim 1, wherein the predetermined threshold is set based on a depth of field.

3. The control apparatus according to claim 2, wherein the predetermined threshold is a first threshold in a case where the depth of field is shallower than a predetermined depth of field, and
wherein the predetermined threshold is a second threshold larger than the first threshold in a case where the depth of field is deeper than the predetermined depth of field.

4. The control apparatus according to claim 1, wherein, when the instructions stored in the memory are executed by the at least one processor, the at least one processor further functions as a second determination unit configured to determine an evaluation value relating to an in-focus level of each of the plurality of areas, and
wherein in the first method, the control unit controls the focus driving unit or the tilt driving unit based on an evaluation value change of the first area and the second area during focus driving or tilt driving.

5. The control apparatus according to claim 4, wherein in the second method, the control unit performs control based on the evaluation value change of at least one of the first area and the second area during the focus driving, and the control unit performs control based on the evaluation value change of an area of the first area and the second area, during the tilt driving, in which the distance is determined to be larger than the predetermined threshold.

6. The control apparatus according to claim 4, wherein in the second method, the control unit performs control, through the focus driving, for focusing on an area of the first area and the second area in which the distance is determined to be smaller than the predetermined threshold, and then performs control, through the tilt driving, for focusing on an area of the first area and the second area in which the distance is determined to be larger than the predetermined threshold.

7. The control apparatus according to claim 4, wherein in the second method, the control unit controls the focus driving unit and the tilt driving unit based on the evaluation value change of each of the first area and the second area during the focus driving.

8. The control apparatus according to claim 4, wherein the control unit determines that there is the evaluation value change in a case where an evaluation value changing amount caused by the focus driving and the tilt driving is larger than a predetermined evaluation value changing amount.

9. The control apparatus according to claim 8, wherein the predetermined evaluation value changing amount caused by the tilt driving is a first evaluation value changing amount in a case where the distance is a first distance, and wherein the predetermined evaluation value changing amount caused by the tilt driving is a second evaluation value changing amount larger than the first evaluation value changing amount in a case where the distance is a second distance larger than the first distance.

10. The control apparatus according to claim 1, wherein the control unit sets the second method in a case where it is determined that there is no evaluation value change caused by the tilt driving.

11. The control apparatus according to claim 1, wherein the first area and the second area are at least one of an area designated by a user and an area in which an object is detected by an object detection.

12. An image pickup apparatus comprising:
   an image sensor; and
   a control apparatus,
   wherein the control apparatus includes:
   a tilt driving unit configured to drive an image sensor to change a tilt of the image sensor;
   a focus driving unit configured to drive a focus lens to move the focus lens in an optical axis direction;
   at least one processor; and
   at least one memory coupled to the at least one processor storing instructions that, when executed by the at least one processor, cause the at least one processor to function as:
   a control unit configured to control the focus driving unit and the tilt driving unit for focusing on at least a first area and a second area in the plurality of areas; and
   a first determination unit configured to determine a control method of the control unit based on whether or not a distance between a position of at least one of the first area and the second area and a position corresponding to a tilt axis in the image is smaller than a predetermined threshold,
   wherein the first determination unit sets the control method to a first method in a case where the distance between the position of the first area and the position corresponding to the tilt axis and the distance between the position of the second area and the position corresponding to the tilt axis are not smaller than the predetermined threshold, and
   wherein the first determination unit sets the control method to a second method which is different from the first method in a case where the distance between the position of at least one of the first area and the second area and the position corresponding to the tilt axis is smaller than the predetermined threshold.

13. The image pickup apparatus according to claim 12, further comprising an imaging optical system as the optical system.

14. A control method configured to control a tilt driving unit configured to drive an image sensor to change a tilt of the image sensor and a focus driving unit configured to drive a focus lens to move the focus lens in an optical axis direction, the control method comprising the steps of:
   controlling the focus driving unit and the tilt driving unit for focusing on at least a first area and a second area in a plurality of areas; and
   determining a control method of the control unit based on whether or not a distance between a position of at least one of the first area and the second area and a position corresponding to a tilt axis in the image is smaller than a predetermined threshold,
   wherein in the determining, the control method is set to a first method in a case where the distance between the position of the first area and the position corresponding to the tilt axis and the distance between the position of the second area and the position corresponding to the tilt axis are not smaller than the predetermined threshold, and
   wherein in the determining, the control method is set to a second method which is different from the first method in a case where the distance between the position of at least one of the first area and the second area and the position corresponding to the tilt axis is smaller than the predetermined threshold.

15. A non-transitory computer-readable storage medium storing a program that causes a computer to execute the control method according to claim 14.

* * * * *